United States Patent
Mallmann et al.

(10) Patent No.: US 10,138,961 B2
(45) Date of Patent: Nov. 27, 2018

(54) DISC BRAKE COMPRISING A VIBRATION DAMPING DEVICE WITH AN ADDITIONAL MASS, AND KIT WITH SUCH A DISC BRAKE

(71) Applicant: Lucas Automotive GmbH, Koblenz (DE)

(72) Inventors: Markus Mallmann, Pfalzfeld (DE); Marco Becker, Oberduerenbach (DE)

(73) Assignee: Lucas Automotive gmbH, Koblenz (DE)

(*) Notice: Subject to any disclaimer, the term of this patent is extended or adjusted under 35 U.S.C. 154(b) by 0 days.

(21) Appl. No.: 15/113,994

(22) PCT Filed: Dec. 15, 2014

(86) PCT No.: PCT/EP2014/077763
§ 371 (c)(1),
(2) Date: Jul. 25, 2016

(87) PCT Pub. No.: WO2015/113693
PCT Pub. Date: Aug. 6, 2015

(65) Prior Publication Data
US 2016/0341268 A1    Nov. 24, 2016

(30) Foreign Application Priority Data
Jan. 28, 2014 (DE) .................. 10 2014 001 061

(51) Int. Cl.
*F16D 65/00* (2006.01)
*F16D 55/00* (2006.01)
*F16D 55/2265* (2006.01)

(52) U.S. Cl.
CPC ......... *F16D 65/0006* (2013.01); *F16D 55/00* (2013.01); *F16D 65/0018* (2013.01);
(Continued)

(58) Field of Classification Search
CPC ............ F16D 65/0006; F16D 55/2265; F16D 65/0018; F16D 55/00; F16D 2055/0008; F16D 2055/0016
See application file for complete search history.

(56) References Cited

U.S. PATENT DOCUMENTS

| 4,154,322 A | 5/1979 | Yamamoto et al. |
| 4,155,430 A | 5/1979 | Kawamura |

(Continued)

FOREIGN PATENT DOCUMENTS

| DE | 2236536 A1 | 2/1974 |
| DE | 2242877 A1 | 3/1974 |

(Continued)

OTHER PUBLICATIONS

German Search Report, Application No. 102014001061.9 dated Aug. 12, 2014.

(Continued)

*Primary Examiner* — Melody M Burch
(74) *Attorney, Agent, or Firm* — MacMillan, Sobanski & Todd, LLC (57) ABSTRACT

A disk brake, in particular for a vehicle, comprising a brake lining arrangement with a friction lining and a pad back plate. The friction lining can interact with a brake disk in order to achieve a braking effect. The disc brake also comprises a vibration damping device which is arranged on a brake caliper or on a brake support, comprising at least one additional mass which is designed as a separate component. The vibration damping device further comprises a receiving pin which is secured to the brake caliper or to the brake support and via which the additional mass can be fixed to the brake caliper or to the brake support.

17 Claims, 4 Drawing Sheets

(52) U.S. Cl.
CPC .. *F16D 55/2265* (2013.01); *F16D 2055/0008* (2013.01); *F16D 2055/0016* (2013.01)

(56) References Cited

U.S. PATENT DOCUMENTS

| | | | |
|---|---|---|---|
| 4,243,123 A | | 1/1981 | Watanabe |
| 5,099,961 A | | 3/1992 | Dreilich et al. |
| 5,887,686 A | | 3/1999 | Tanaka et al. |
| 6,155,386 A | * | 12/2000 | Hirai ................ F16D 55/02 188/161 |
| 7,845,478 B2 | | 12/2010 | Picot |
| 2004/0188190 A1 | * | 9/2004 | Niwa ................ F16D 65/0025 188/73.37 |
| 2004/0251093 A1 | * | 12/2004 | Simmons ................ B62L 3/08 188/72.4 |
| 2005/0173206 A1 | * | 8/2005 | Reuter ................ F16D 65/18 188/72.7 |
| 2006/0185942 A1 | * | 8/2006 | Costa ................ B62L 1/005 188/71.1 |
| 2011/0278110 A1 | * | 11/2011 | Yoko ................ F16D 65/0006 188/73.37 |
| 2011/0308900 A1 | * | 12/2011 | Drewes ................ F16D 65/0006 188/73.37 |
| 2012/0024643 A1 | * | 2/2012 | Crippa ................ F16D 65/0018 188/234 |

FOREIGN PATENT DOCUMENTS

| | | | |
|---|---|---|---|
| DE | 2708317 A | * | 9/1977 |
| DE | 3044939 A1 | | 6/1982 |
| DE | 4020668 A1 | | 1/1992 |
| DE | 69102346 T2 | | 11/1994 |
| DE | 19622546 A1 | | 12/1997 |
| DE | 10305308 A1 | | 4/2004 |
| DE | 102005021098 B3 | | 8/2006 |
| DE | 60200600829 T2 | | 5/2009 |
| EP | 0380769 A1 | | 8/1990 |
| EP | 0727590 A1 | | 8/1996 |
| EP | 0806585 A2 | | 11/1997 |
| EP | 1688636 A2 | | 8/2006 |
| EP | 2174034 A1 | | 4/2010 |
| EP | 2446165 A1 | | 5/2012 |
| GB | 1431797 A | | 4/1976 |
| JP | 59200819 A | * | 11/1984 |
| WO | 2009001381 A1 | | 12/2008 |
| WO | 2010150164 A1 | | 12/2010 |

OTHER PUBLICATIONS

International Search Report and the Written Opinion, Application No. PCT/EP2014/077763 filed Dec. 15, 2014, dated Mar. 19, 2015.
International Preliminary Report on Patentability, Application No. PCT/EP2014/077763 filed Dec. 15, 2014, dated Apr. 8, 2016.

* cited by examiner

DISC BRAKE COMPRISING A VIBRATION DAMPING DEVICE WITH AN ADDITIONAL MASS, AND KIT WITH SUCH A DISC BRAKE

CROSS-REFERENCE TO RELATED APPLICATIONS

This application is a national stage of International Application No. PCT/EP2014/077763 filed 15 Dec. 2014, the disclosures of which are incorporated herein by reference in entirety, and which claimed priority to German Patent Application No. 10 2014 001 061.9 filed 28 Jan. 2014, the disclosures of which are incorporated herein by reference in entirety.

BACKGROUND OF THE INVENTION

The invention relates to a disc brake that is particularly embodied as a fixed-caliper disc brake or floating-caliper disc brake for a vehicle, comprising a brake pad assembly with a friction pad and a pad back plate, the friction pad being engageable with a brake disc in order to achieve a braking effect, and at least one vibration-damping device with at least one additional mass arranged on a brake caliper or on a brake carrier.

Such a disc brake is known, for example, from document EP 0 380 769 B1. In a fixed-caliper disc brake described therein, additional masses are mounted on the housing in the circumferential direction such that they are positioned radially next to the brake disc. Alternatively, the additional masses can be cast directly on one of the housing parts, thus eliminating subsequent fastening. Moreover, an inwardly clamping floating-caliper disc brake is described in document EP 0 380 769 B1 in which an additional mass is fastened on a side of an arm of a substantially U-shaped brake housing facing away from the piston. In another embodiment, in addition to recesses for guiding brake shoes, additional masses are adhered to a brake carrier via an elastic adhesive layer.

Through the frictional contact between the friction pad and the brake disc, friction-induced oscillations are often introduced into the brake pad assembly, for example as a result of the so-called stick-slip effect. These friction-induced oscillations are transmitted from the brake pad assembly to adjacent components of the disc brake, particularly to the brake piston or the brake carrier. This has a negative impact particularly when the frequency of the friction-induced oscillation coincides with the natural resonant frequency of the brake pad assembly and/or of one or more of the other components of the disc brake. As a consequence of such a transmission of a friction-induced oscillation, the friction-induced oscillation leaves the disc brake as an acoustically perceptible, unpleasant sound wave ("squealing").

The transmission of the friction-induced oscillation can be effectively suppressed if the resonant frequencies of adjacent components of the disc brake, for example of the brake pad assembly and the brake caliper, do not match. This is tantamount to a damping of the friction-induced oscillation. It is known from the prior art to influence the mass distribution in (at least a portion of) the disc brake by means of additional weights, referred to here as additional masses, for this purpose. In order to fasten such additional masses to the disc brake, in conventional disc brakes the additional masses are adhered directly to a surface of the brake carrier.

BRIEF SUMMARY OF THE INVENTION

It is a feature of the invention to provide a disc brake of the type mentioned at the outset in which the mass distribution of the disc brake can be adjusted flexibly and quickly and reliably maintained.

The feature is achieved by a disc brake of the type mentioned at the outset, in which the additional mass is embodied as a separate component and the vibration-damping device further comprises a locating bolt fastened to the brake caliper or to the brake carrier by means of which the additional mass can be fixed to the brake caliper or to the brake carrier. The locating bolt preferably engages with a recess embodied in the additional mass. For each vibration-damping device, an additional mass or several additional masses can thus be provided, and one or more vibration-damping devices can be arranged on the brake caliper and/or brake carrier or be fastened thereto by means of a respective locating bolt.

Consequently, the additional mass can be positioned in any position on the brake caliper or on the brake carrier of the disc brake. In particular, the additional mass can be positioned in such positions of the brake caliper or of the brake carrier at which secure fastening cannot easily be achieved by means of an adhesive connection as described above. Since the contact between the additional mass and the brake caliper or the brake carrier is established via the locating bolt, an additional mass can be fastened universally in any position on the brake caliper or on the brake carrier. Surface characteristics of the brake caliper/brake carrier are irrelevant to the mounting of the additional mass.

Preferably, a first thread is embodied on a part of the locating bolt facing toward the brake caliper or the brake carrier, the thread being securely connected to the brake caliper or the brake carrier by means of a second thread embodied on the brake caliper or on the brake carrier that is complementary to the first thread. The second thread can particularly be embodied on a guide screw of a guide mechanism of the brake caliper by means of which the brake caliper is fastened to the brake carrier. The locating bolt then corresponds to an extension of the guide screw. A tool receiving part of the locating bolt that is farther away from the brake caliper/brake carrier than the part facing toward it is then preferably polygonal, for example hexagonal, whereby the locating bolt can be screwed into the second thread by means of conventional assembly tools. Assembly can thus be performed in a quick, easy and cost-effective manner. No hardening of any adhesive is necessary, and the vibration-damping device is loadable immediately after installation.

In one embodiment of the invention, the locating bolt is elongate and has on its lateral surface a support structure, for example a groove structure, that is aligned in its longitudinal direction. In addition or alternatively, the locating bolt can also have a groove structure as its support structure that is aligned transverse to its longitudinal direction. The groove structure can be produced, for example, through chip-removing machining or through chipless machining, such as cold forming. In one especially simple case, the groove structure is a thread that can have the same shape as the first or second thread, for example. The groove structure preferably does not extend beyond the surface of the locating bolt in the vicinity of the groove structure; that is, in the region of the groove structure, the locating bolt has substantially the same outside diameter as in the region of the remaining locating bolt. Alternatively, however, a provision can also be made that the groove structure extends beyond the lateral surface of the locating bolt in the vicinity of the groove structure.

Particularly if the locating bolt has at least one of the abovementioned groove structures, the additional mass can preferably be fixed to the locating bolt through pressing such that the groove structure engages in a surface of the additional mass. In this case, it is advantageous if the groove structure extends beyond the lateral surface; after all, it is the tips of the groove structure that first come into contact with the surface of the additional mass upon pressing. As a result of the high local pressure acting in the region of the tips, the tips are effectively pressed into the surface. Consequently, the additional mass can be easily and securely fixed to the locating bolt using this method. Preferably, the locating bolt and/or the additional mass are substantially cylindrical. The parts can thus be produced, for example, through chip-removing machining or chipless machining, such as cold forming. In one embodiment of the invention, the locating bolt is embodied substantially as an externally threaded bolt having an external hexagon-shaped bolt head in its tool receiving region. A disc is preferably embodied adjacent to the bolt head. In contrast, the additional mass is embodied as a cylinder, the cylinder preferably having a central through hole along the longitudinal axis. Alternatively, at least one of the two end surfaces can have a central recess, particularly in the form of a core hole bore, that is penetrated by the locating bolt in the assembled state. In order to enable adjustment with respect to the position of the additional mass, a provision can also be made that the through hole or core hole bore is introduced eccentrically to the longitudinal axis. For easy assembly, the additional mass can have an inside diameter in the initial state that is greater than the outside diameter of the locating bolt, whereby the additional mass can easily be placed onto the locating bolt in a contactless manner. The additional mass can then be pressed together with the locating bolt as described above. However, it is also conceivable for the inside diameter of the additional mass to be less than the outside diameter of the locating bolt, whereby the additional mass is in frictional contact with the locating bolt after placement onto the locating bolt.

According to the invention, in order to fix the additional mass to the locating bolt, a provision can also be made that an annular groove is embodied in the locating bolt at an end facing away from the brake caliper or the brake carrier. In this case, a provision is made a conventional circlip, preferably an external circlip, engages with the annular groove and thus engages around the locating bolt. The circlip can optionally be in contact with the additional mass in the region of one of its end surfaces, so that the additional mass is already held without play against the locating bolt by the circlip. However, when the additional mass is pressed onto the locating bolt, the annular groove can alternatively be spaced apart from the additional mass, whereby the circlip can be introduced more easily into the annular groove. According to the invention, the annular groove is positioned in both cases such that the additional mass is closer to the brake caliper or brake carrier than the annular groove. In one development of the invention, the additional mass has a base portion and a block portion. This additional mass can be embodied so as not to be cylindrically symmetrical, for example. The base portion can be embodied in the form of a flat fastening tab. Preferably, the fastening tab then lies flat against the brake caliper or brake carrier. The additional installation space taken up by the additional mass is thus minimized. By virtue of the frictional contact between the fastening tab and the brake caliper/brake carrier, it can also be ensured that the additional mass maintains a certain position, thus maintaining the mass distribution in the disc brake. If the additional mass has a base portion and a recess, this recess is preferably embodied in the region of the base portion. The recess is preferably embodied as a core hole bore with or without chamfered edge, the bore axis running perpendicular to a center plane of symmetry and a surface of the flat base portion. Therefore, if the additional mass has a base portion and a block portion, it is preferably arranged transverse to the locating bolt. The recess can be arranged centrally in the base portion, for example. According to the invention, the base portion and the block portion have at least one equal center plane of symmetry.

In a development of the invention, a provision can particularly be made that a plurality of additional masses can be fixed to various receiving points on the brake caliper or on the brake carrier. The additional masses can be fastened in that case by means of substantially equal locating bolts, for example. The locating bolt can thus be produced in large quantities as a universally applicable component. At least two of the additional masses can be arranged on opposite sides of the brake caliper or brake carrier with respect to the brake disc. The mass distribution of the entire brake can thus be variably set.

In one variant of the invention, at least two of the additional masses have different masses (weights). If these additional masses have a base portion and a block portion, the masses of the base portion can be substantially equal, so that the additional masses differ merely by the masses of the block portions. In the assembled state, the block portions can have different alignments with respect to the base portions. For example, the block portions can be aligned so as to be mutually antiparallel with respect to the base portions. Therefore, if a block portion is aligned in the forward direction along the circumference of the rotating brake disc with respect to a base portion, particularly with respect to the center of the recess, then another block portion is oriented in the reverse direction with respect to a base portion. Alternatively, one additional mass can also be oriented radially inward with respect to the brake disc and one additional mass can be oriented radially outward with respect to the brake disc.

If the additional mass has a base portion, a groove structure can also be embodied on same that engages in a surface of the brake caliper or brake carrier. This enables the mass distribution in the disc brake to be maintained even in the event of high external forces. The groove structure can have all of the features of the above-described groove structure of the locating bolt.

Alternatively, a provision can also be made that projections are formed on the brake caliper in the region of the attack of the base portion of the additional masses that counteract the rotation of the positioned additional mass and/or permit installation only in a predefined position.

The mass distribution can be set with particular flexibility particularly by means of several additional masses by having two or more additional masses be fixable by means of the same locating bolts to the same receiving point on the brake caliper or on the brake carrier, for example. The respective additional masses can have different weights. In particular, in order to economize installation space, for example, additional masses with base and block portion arranged transversely on the locating bolt can be combined with additional masses arranged longitudinally on the locating bolt. In other words, additional masses having different geometries can be combined in a tight space in order to enable the mass distribution of the brake carrier to be set in a way that is flexible but makes efficient use of installation space.

In another embodiment of the invention, the additional mass is or the additional masses are made in whole or in part of a material having a greater density that the material from which the brake caliper or the brake carrier is made, particularly in the vicinity of the respective receiving point. In addition or alternatively, if the additional mass has a base portion and a block portion, the elasticity of the additional mass can also be greater than that of the brake caliper/brake carrier, particularly in the vicinity of the respective receiving point. In this way, a high damping effect and optimal fastening to the brake caliper/brake carrier can thus be achieved through the selection of material with small additional masses, particularly if a groove structure is embodied on the base portion. According to the invention, the disc brake can be embodied as a fixed-caliper disc brake or a floating-caliper disc brake. If the disc brake is embodied as a fixed-caliper disc brake, the brake caliper engages around the brake disc and the vibration-damping device or the vibration-damping devices are preferably arranged on the brake caliper.

In the event that the disc brake is embodied as a floating-caliper disc brake, that is, the brake caliper is mounted in a movable/displaceable manner on the stationary brake carrier, the vibration-damping devices can be respectively arranged on the brake caliper or on the brake carrier. The brake caliper can be mounted on the brake carrier by means of a guide screw of a guide mechanism along which a relative movement between the brake caliper and the brake carrier is aligned during the braking process, i.e., upon engagement of friction pad and brake disc. In this case, the locating bolt is embodied as an extension of the guide screw beyond a surface of the brake caliper.

The guide screw is preferably arranged in a corner region of the disc brake. Since a separate locating bolt need not be mounted in this case, the disc brake is quick and easy to manufacture. For this purpose, the additional mass can simply be placed onto the guide screw extended by the locating bolt and fixed thereto, for example by pressing or screwing. Such securement of the additional mass also has the advantage that the additional mass is fastened directly to a component transmitting the friction-induced oscillations. The vibration-damping effect of the additional mass is thus reinforced. Consequently, relatively small weights of the additional masses in absolute terms are sufficient to effectively suppress the transmission of the friction-induced oscillations.

The invention further relates to a kit with a disc brake of the type described above, wherein commensurately dimensioned additional masses can optionally be put in place according to different vibration frequencies to be dampened by the vibration-damping device. As already set out in detail above, each additional mass is embodied as a separate component, and the vibration-damping device further comprises a locating bolt fastened to the brake caliper or to the brake carrier by means of which the respective additional mass can be fixed to the brake caliper or to the brake carrier.

Other advantages of this invention will become apparent to those skilled in the art from the following detailed description of the preferred embodiments, when read in light of the accompanying drawings.

DETAILED DESCRIPTION OF THE INVENTION

Figure 1:
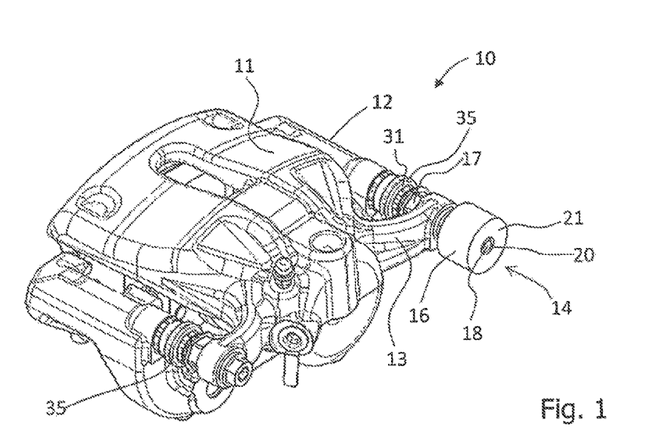
FIG. 1 shows a perspective overview of a first embodiment of a disc brake according to the invention, the vibration-damping device being shown in the mounted state.

FIG. 1 shows a perspective overview of a first embodiment of a disc brake 10 according to the invention. The disc brake 10 comprises a brake pad assembly (not shown) with a friction pad (not shown) and a pad back plate (not shown), the friction pad being engageable with a brake disc in order to achieve a braking effect. A brake caliper 11 engaging around the brake disc is fastened by means of a locating bolt 18 passing through an arm 13 of the brake caliper 11 to a guide screw 17 of a guide mechanism 31 and, by means thereof, to a brake carrier 12, so as to be displaceable in the longitudinal direction of the guide screw 17. The locating bolt 18 is part of a vibration-damping device 14, which also has a cylindrical additional mass 16 embodied as a separate component that is mounted on a part of the locating bolt facing away from the brake caliper. The additional mass 16 is thus fixed by means of the locating bolt 18 to the brake caliper 11 (cf. FIGS. 2a to 2c). The locating bolt 18 engages with a recess 20 embodied in the additional mass 16 that extends in the longitudinal direction L of the additional mass 16 through the entire additional mass 16. On an end surface 21 that is distant from the brake caliper 11, the recess 20 has a smaller diameter than on the interior of the cylinder.

A first thread (not shown) is embodied on a part 22 of the locating bolt 18 facing toward the brake caliper 11. A second thread complementary to the first thread is embodied in the (hexagon) head of the guide screw 17, and the two threads engage in one another, whereby the locating bolt 18 is securely connected to the guide screw 17 and hence to the brake caliper 11. Alternatively, the second thread can be embodied directly in the brake caliper 11, for example in the arm 13, whereby the locating bolt 18 can be screwed into the brake caliper 11. During mounting, the first thread on the facing part 11 is screwed into the head of the guide screw 17 by means of a tool holding fixture 23, here in the form of an external hex, in a tool receiving region of the locating bolt 18. A disc 25 is arranged on the locating bolt 18 adjacent to the tool holding fixture 23 that lies flush with a surface of the arm 13 of the brake caliper 11 after mounting. In the mounted state, the locating bolt 18 thus corresponds to an extension of the guide screw 17 of the guide mechanism 31 of the brake caliper 11 beyond the arm 13 of the brake caliper 11. The locating bolt 18 and the additional mass 16 are also substantially cylindrical according to the symmetry of the guide screw 17. The guide mechanism 31 is protected in portions by a bellows 35 made of rubber.

Figure 2:
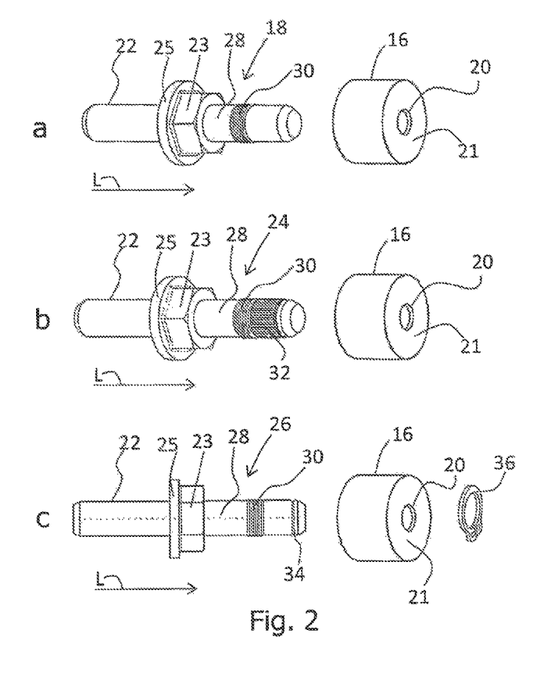
FIGS. 2a-2c show detailed views of the vibration-damping device from FIG. 1 as exploded drawings, with three variants of the locating bolt being shown.

FIGS. 2a to 2c show three variants of the vibration-damping device 14, the locating bolt 18 being a part of the first one. In addition to the locating bolt 18, two modifications of the locating bolt are shown, which are designated as locating bolt 24 and locating bolt 26 (cf. FIGS. 2b and 2c). As can be seen from FIGS. 2a to 2c, all of the locating bolts 18, 24, 26 are elongate, and each has on its lateral surfaces 28 a groove structure 30 aligned transverse to its longitudinal direction L. The two modified locating bolts 24, 26 also have all of the features of the locating bolt 18. Moreover, according to the invention, any features of the locating bolts 18, 24, 26 can be combined.

Figure 3:
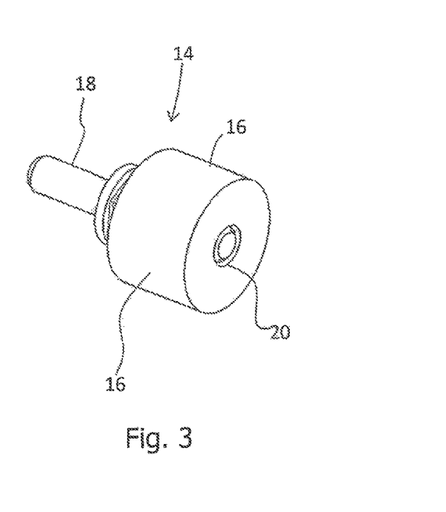
FIG. 3 shows a perspective detailed view of the vibration-damping device from FIG. 1.

During assembly, each of the additional masses 16 is pressed together with the respective locating bolts 18, 24, 26. The additional mass 16 pressed onto the locating bolt 18 is shown in FIGS. 1 and 3. As a result of the pressing, groove structures, for example the groove structure 30, embodied on the locating bolt 18, 24, 26 engage in a surface of the additional mass, which is an inner circumferential surface in this case. For this purpose, in addition to the groove structure 30 arranged transverse to the longitudinal direction L, the locating bolt 18 according to the first modification also has a groove structure 32 arranged in the longitudinal direction L that extends in the circumferential direction along the entire circumference of the locating bolt 18. The grooves run parallel to one another. The locating bolt 26 according to the second modification differs from the locating bolt 18 in that an annular groove 34 is embodied on an end facing away from the brake caliper 11. A circlip 36 engages around the locating bolt 26 such that the additional mass 16 is effectively prevented from detaching from the locating bolt 26.

Figure 4:
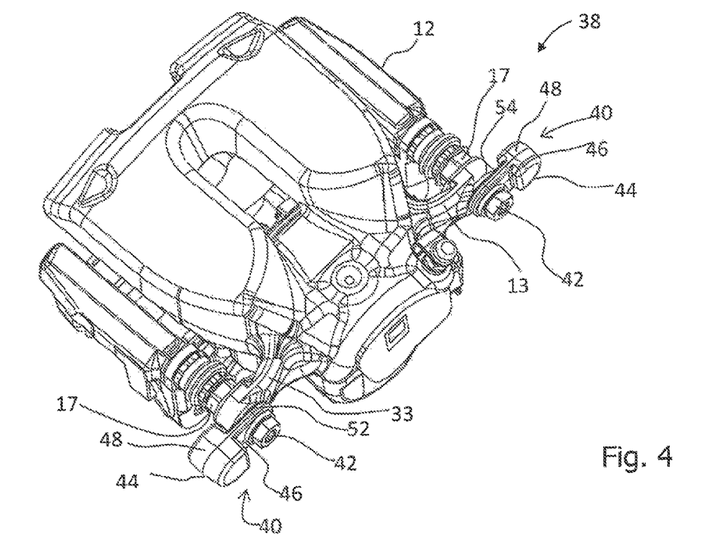
FIG. 4 shows a perspective overview of a second embodiment of a disc brake according to the invention, in which two additional masses fixed to two receiving points are shown.
Figure 5:
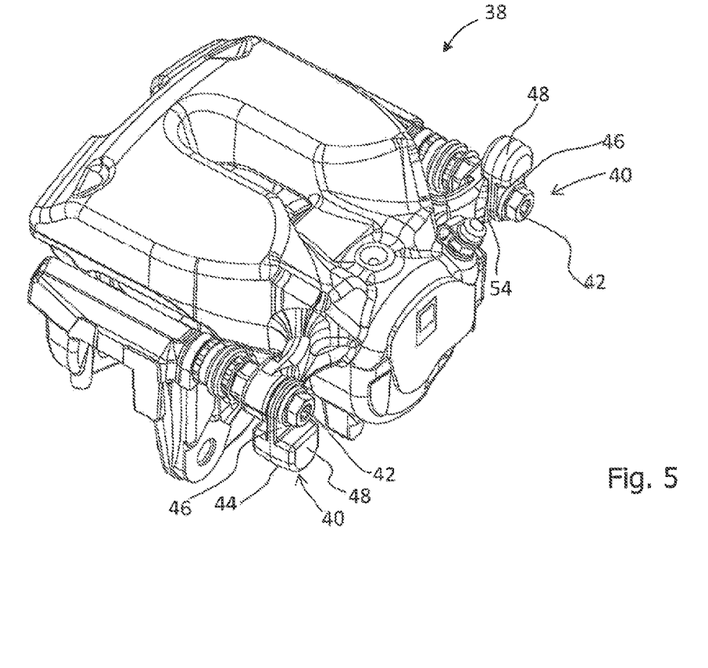
FIG. 5 shows a perspective overview of the disc brake from FIG. 4, in which the two additional masses are aligned in opposite directions.

A disc brake 38 according to a second embodiment of the invention shown in FIGS. 4 and 5 differs from the disc brake 10 in that, instead of the vibration-damping device 14, a vibration-damping device 40 is respectively arranged at a first and at a second receiving point 52, 54. These receiving points 52, 54 are arranged on two different arms 13, 33 of the brake caliper 11. The vibration-damping device 40 can have all of the features of the vibration-damping device 14 individually or in combination. In the vibration-damping device 40 shown in the figures, a screw 42 is used to fasten additional masses 44 instead of the locating bolt 18, the screw 42 being embodied here as a machine screw (external hex). It is also conceivable, in particular, to use one of the previously described locating bolts 18, 24, 26 instead of the screw 42.

Each of the additional masses 44 has a base portion 46 in the form of a flat fastening tab and a block portion 48. The additional mass 44 is shown in detail in FIGS. 9a to 9d and described in conjunction with these figures. In the assembled state shown in the figures, the additional masses 44 are braced with their base portions 36 between the arm 13 of the brake caliper 11 and the head of the screw 42. The block portion 48 has a greater mass than the base portion 46, and the fastening tab is positioned so as to lie flatly against the arm 13 of the brake caliper 11. In FIG. 4, the additional masses 44 are aligned such that the two block portions 48 and the base portions 46 are aligned opposite one another in both additional masses 44. In the exemplary embodiment shown in FIG. 4, the block portions 48 of the additional masses 44 thus extend in the circumferential direction of the disc brake and in the circumferential direction of the brake disc to be braked. Alternatively, the additional masses 44 can also be aligned perpendicular to this circumferential direction, for example, as shown in FIG. 5.

Figure 6:
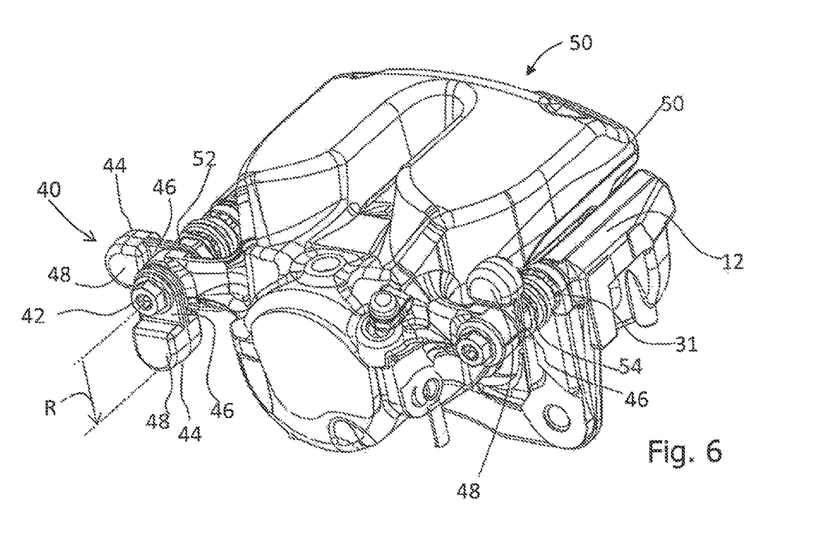
FIG. 6 shows a perspective overview of a third embodiment of a disc brake according to the invention, in which two additional masses are fixed to one receiving point and one additional mass is fixed to another receiving point.

A third embodiment of a disc brake 50 according to the invention shown in FIG. 6 differs from the disc brake 38 in that two additional masses 44 are arranged at the receiving point 53 that are aligned to as to be perpendicular to one another. An additional mass 44 arranged at the second receiving point 54 is aligned in another, different direction in which none of the additional masses 44 at the first receiving point is aligned. Here, too, the receiving points and the screws 42 (i.e., locating bolts) are each arranged on a guide screw of the guide mechanism 31 of the disc brake. To align the additional masses 44, projections (not shown in the figures) can optionally be embodied on the brake caliper 11 or on the brake carrier 12 on which the block portions 48 are supported such that the additional mass is prevented from rotating—i.e., the block portions 48 are prevented from rotating around the base portions 46.

The term "alignment" is used here to refer to the orientation of the additional mass 44, i.e., the direction in which the block portions 48 extend from the base portions 46. For purposes of illustration, a direction vector R is shown in FIG. 6 that makes the alignment of one of the additional masses 44 arranged at the receiving point 52 clear. Since the base portions 46 rest directly against the brake caliper 11 at least in portions, groove structures (not shown) on the surfaces of the base portions 46 can be engaged in a surface of the brake caliper 11.

Figure 7:
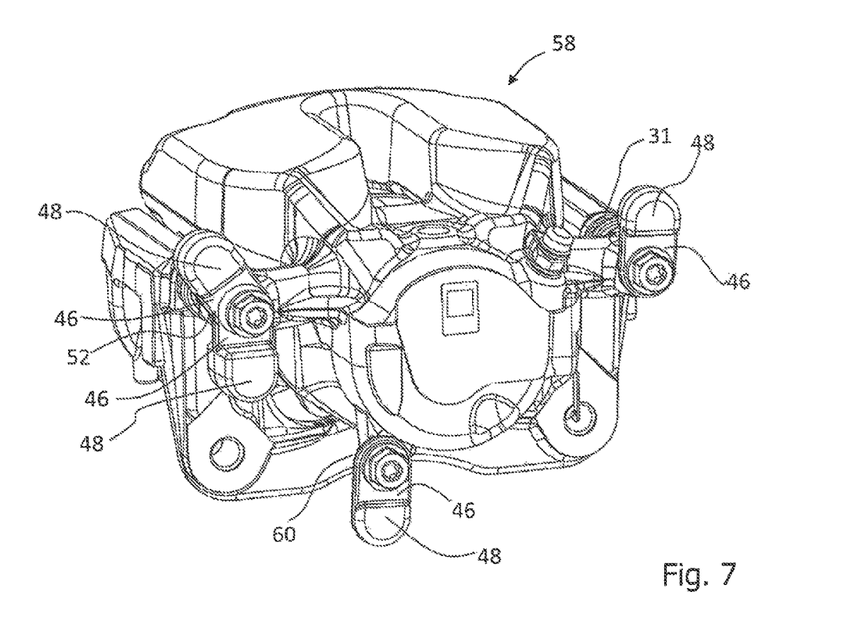
FIG. 7 shows a perspective overview of a fourth embodiment of a disc brake according to the invention, in which one respective additional mass is fixed to two different receiving points and two additional masses are fixed to one receiving point.

A fourth embodiment of a disc brake 58 according to the invention shown in FIG. 7 differs from the disc brake 50 in that a third vibration-damping device 40 is additionally arranged at a third receiving point 60 on the same side of the brake caliper 11 as the first receiving point 52 and the second receiving point 54. Unlike the receiving points 52 and 54, the receiving point 60 is not arranged on a guide screw 17 of the guide mechanism 31 of the brake caliper 11, but rather as a separate receiving point 60 spaced apart from the guide mechanism 31. In the example shown, the third receiving point 60 is the third clamping point of the disc brake. Alternatively, however, it can be embodied specifically for fastening a vibration-damping device.

Moreover, the disc brake 58 has all of the features of the disc brake 50.

Figure 8:
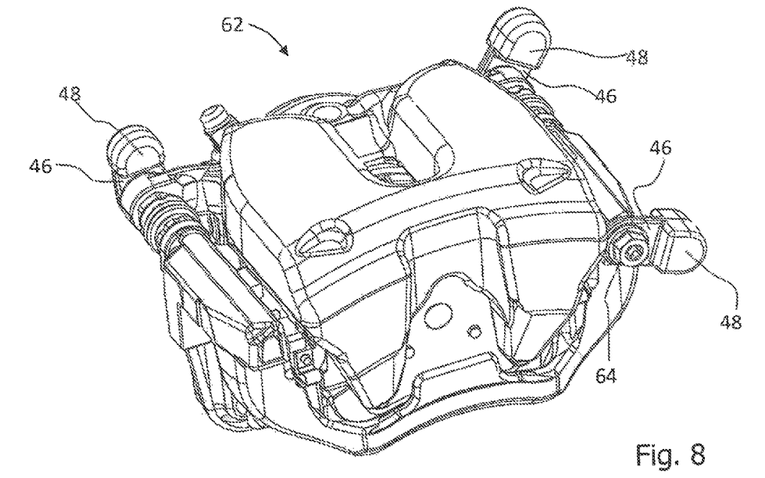
FIG. 8 shows a perspective overview of a fifth embodiment of a disc brake according to the invention, in which one respective additional mass is fixed to three receiving points.

A fifth embodiment of a disc brake 62 according to the invention shown in FIG. 8 differs from the disc brake 50 in that a fourth receiving point 64 is arranged on one of the guide screws 17 of the guide mechanism 31 on a side opposite the side of the brake caliper 11 on which the first and second receiving points 52, 54 are arranged. Moreover, the disc brake 62 has all of the features of the disc brake 58.

The disc brakes 10, 38, 50, 58 and 62 are shown as floating-caliper disc brakes.

Alternatively, however, they can also be embodied as fixed-caliper disc brakes.

Figure 9:
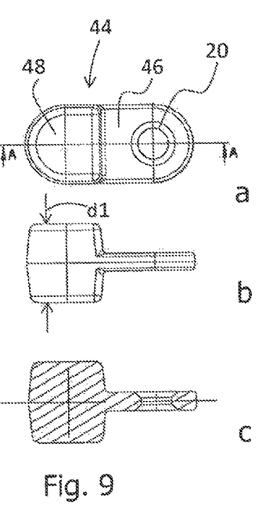
FIGS. 9 to 11 show different views of differently dimensioned additional masses.
Figure 10:
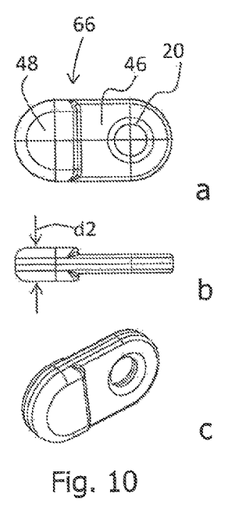
Figure 11:
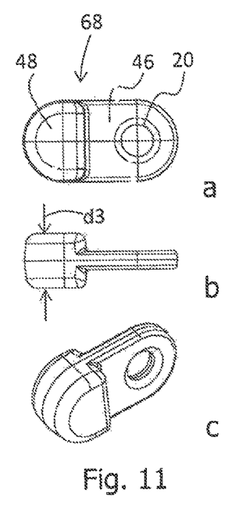

FIGS. 9 to 11 show the additional mass 44 in various side views and in a cross-sectional view (FIG. 9c) along the sectional plane A designated in FIG. 9a, as well as two modified additional masses 66, 68. The additional masses 66 and 68 differ from the additional mass 44 in that their block portion 48 is respectively smaller and larger than that of the additional mass 44. The block portions 48 of the three additional masses 44, 66, 68 are made of the same material. The base portions 46 of the three depicted variants of the additional masses 44, 66, 68 have substantially the same shape. In the figures, a thickness d3 of the block portion 48 of the additional mass 68 is greater than the thickness d2 of the additional mass 66 and smaller than the thickness d1 of the block portion 48 of the additional mass 44. Consequently, the additional mass 68 is heavier than the additional mass 66 but lighter than the additional mass 44. For example, the additional mass 44 can weigh 80 grams, the additional mass 68 can weight 50 grams and the additional mass 66 can weigh 35 grams.

The additional masses 16, 44, 66, 68 are preferably made from metal using a cold- or hot-shaping process. Alternatively, they can be manufactured by sintering or casting. The block portion 48 can be made of a different material than the base portion 46. In particular, the block portion 48 can be made of a material with a greater density than the base portion 46. Examples of materials that merit consideration are plastic for the base portion 46 and metal for the block portion 48. In an embodiment not shown in the figures, the base portion can extend into the block portion or pass completely through the block portion, thus dividing the latter into two regions. Particularly vibrations of the additional masses in the direction of the thickness d can be effectively damped in this way. If the block portion 48 is made of a different material than the base portion 46, the two portions 46, 48 can be screwed, caulked or welded to one another. Alternatively, the two portions 46, 48 can be joined together by a common plastic jacket.

According to the invention, a kit with one of the disc brakes 10, 38, 50, 58 and 62 has various additional masses, for example several additional masses 16, 44, 66 and 68. Moreover, the kit can also have various locating bolts 60 and differently dimensioned screws 42 for mounting the additional masses. As a result, the user can flexibly choose which additional masses are used for optimal vibration damping.

It is thus possible to set different mass distributions on the brake caliper/brake carrier in a quick and uncomplicated manner using simple, universally applicable components of the disc brake, particularly standardized locating bolts and additional masses. In this way, the propagation of friction-induced oscillations to the brake caliper/brake carrier is effectively suppressed and the emission of undesired noises to the environment prevented.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A disc brake for a vehicle comprising:
   at least one vibration-damping device with at least one additional mass arranged on a brake caliper or on a brake carrier,
   wherein the at least one additional mass is embodied as a separate component and the at least one vibration-damping device further comprises a locating bolt fastened to the brake caliper or to the brake carrier by means of which the at least one additional mass is configured to be fixed to the brake caliper or to the brake carrier,
   wherein the locating bolt is elongate and has on a lateral surface a groove structure aligned in a longitudinal direction and/or transverse to the longitudinal direction,
   wherein the at least one additional mass is configured to be fixed by pressing to the locating bolt such that the groove structure engages in a surface of the at least one additional mass,
   wherein an annular groove is embodied in the locating bolt at an end facing away from the brake caliper or the brake carrier in which a circlip engages around the locating bolt such that the circlip prevents the at least one additional mass from detaching from the locating bolt.

2. The disc brake as set forth in claim 1, wherein the locating bolt engages with a recess embodied in the at least one additional mass.

3. The disc brake as set forth in claim 1, wherein a first thread is embodied on a part of the locating bolt facing toward the brake caliper or the brake carrier, the thread being securely connected to the brake caliper or the brake carrier by means of a second thread embodied on the brake caliper or on the brake carrier that is complementary to the first thread.

4. The disc brake as set forth in claim 1, wherein the locating bolt and/or the at least one additional mass is substantially cylindrical.

5. The disc brake as set forth in claim 1,
   wherein the at least one additional mass has a base portion in the form of a flat fastening tab and a block portion, the block portion having a greater mass than the base portion and the fastening tab lying flat against the brake caliper or the brake carrier.

6. The disc brake as set forth in claim 5, wherein the locating bolt engages with a recess embodied in the at least one additional mass, the recess being embodied as a core hole bore in the at least one additional mass in the region of the base portion.

7. The disc brake as set forth in claim 1, wherein the at least one additional mass includes a plurality of additional masses configured to be fixed at different receiving points to the brake caliper or to the brake carrier by means of substantially equivalent locating bolts including the locating bolt, wherein at least two of the plurality of additional masses are arranged on opposite sides of the brake caliper or brake carrier with respect to a brake disc.

8. The disc brake as set forth in claim 7, wherein at least two of the plurality of additional masses have different masses and/or block portions are aligned differently with respect to the base portions.

9. The disc brake as set forth in claim 5, wherein a respective groove structure is embodied on the base portion or base portions that engages in a surface of the brake caliper or of the brake carrier.

10. The disc brake as set forth in claim 7, wherein at least two of the plurality of additional masses are configured to be fixed by means of the same locating bolt at the same receiving point to the brake caliper or to the brake carrier.

11. The disc brake as set forth in claim 7, wherein at least one of the plurality of additional masses is made of a material having a greater density and/or elasticity than the material of which the brake caliper or brake carrier is made in the vicinity of the respective receiving point.

12. The disc brake as set forth in claim 1, wherein the disc brake is embodied as a fixed-caliper disc brake, wherein the at least one vibration-damping device is arranged on the brake caliper.

13. A kit comprising a disc brake as set forth in claim 1, wherein commensurately dimensioned one or more further additional masses are configured to optionally be put in place according to different vibration frequencies to be dampened by the at least one vibration-damping device.

14. The disc brake as set forth in claim 5, wherein the disc brake is embodied as a fixed-caliper disc brake, wherein the at least one vibration-damping device is arranged on the brake caliper.

15. The disc brake as set forth in claim 5, wherein the disc brake is embodied as a floating-caliper disc brake, wherein the brake caliper is displaceably mounted on the brake carrier.

16. A kit comprising a disc brake as set forth in claim 5, wherein commensurately dimensioned further additional masses are configured to optionally be put in place according to different vibration frequencies to be dampened by the at least one vibration-damping device.

17. A disc brake for a vehicle comprising:
- at least one vibration-damping device with at least one additional mass arranged on a brake caliper or on a brake carrier,
- wherein the at least one additional mass is embodied as a separate component and the at least one vibration-damping device further comprises a locating bolt fastened to the brake caliper or to the brake carrier by means of which the at least one additional mass is configured to be fixed to the brake caliper or to the brake carrier,
- wherein the locating bolt is elongate and has on a lateral surface a groove structure aligned in a longitudinal direction and/or transverse to the longitudinal direction,
- wherein the at least one additional mass is configured to be fixed by pressing onto the locating bolt such that the groove structure engages in an inner circumferential surface of the at least one additional mass,
- wherein the disc brake is embodied as a floating-caliper disc brake, wherein the brake caliper is displaceably mounted on the brake carrier,
- wherein the locating bolt is a guide screw of a guide mechanism of the brake caliper that is extended beyond a surface of the brake caliper.

\* \* \* \* \*